Patented May 5, 1925.

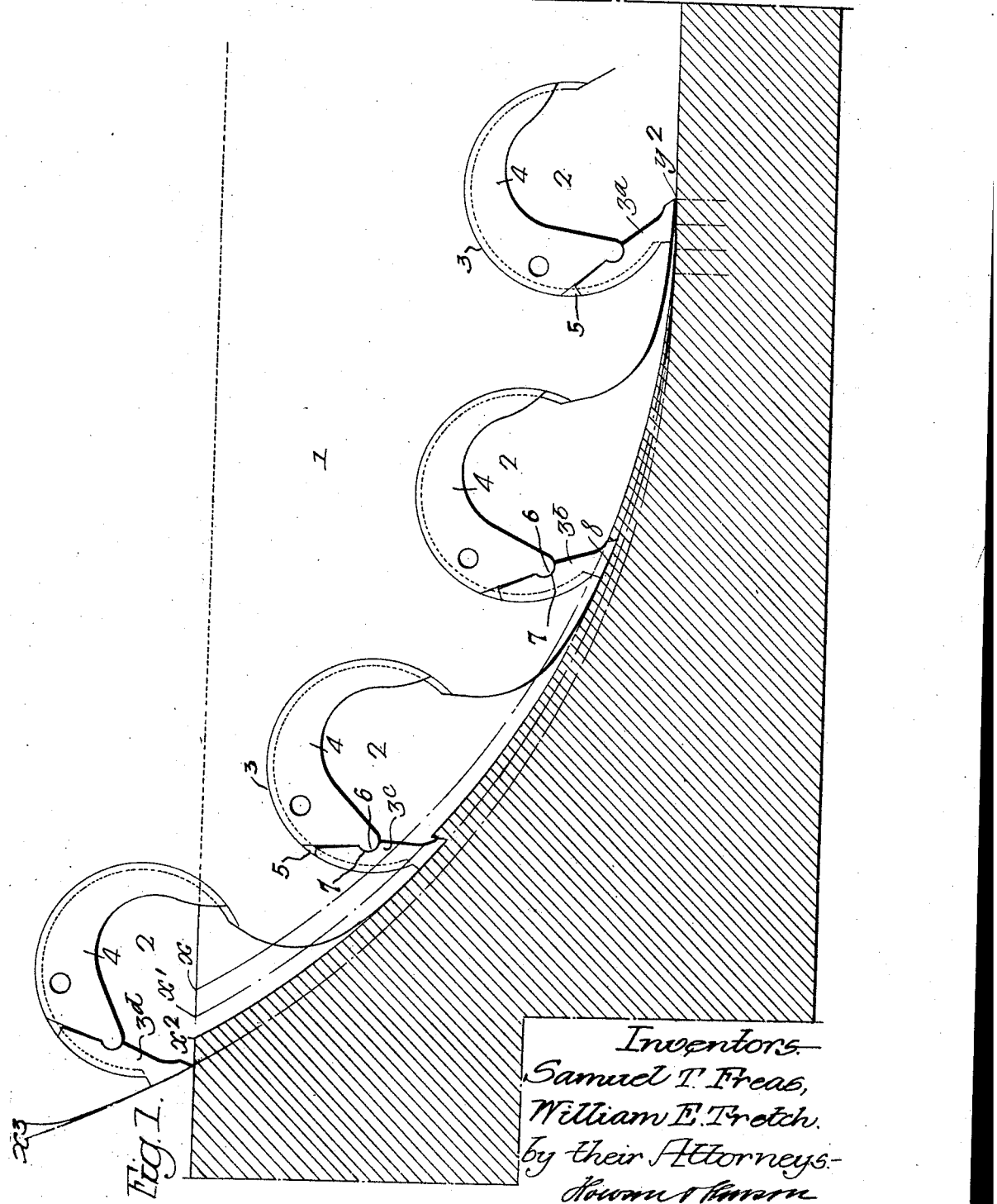

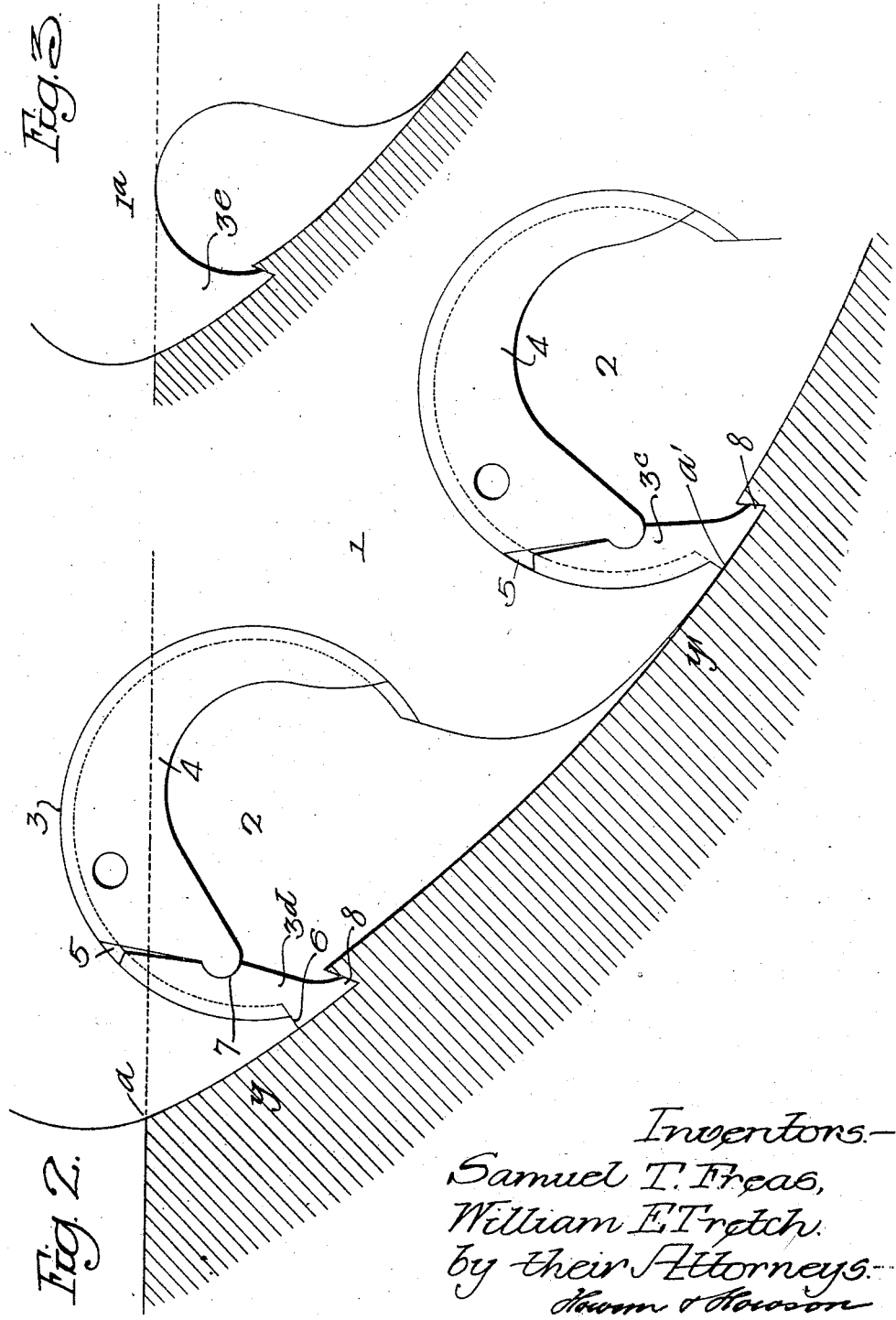

1,536,783

UNITED STATES PATENT OFFICE.

SAMUEL T. FREAS, OF TRENTON, NEW JERSEY, AND WILLIAM E. TRETCH, OF PHILADELPHIA, PENNSYLVANIA, ASSIGNORS TO HENRY DISSTON & SONS, INCORPORATED, OF PHILADELPHIA, PENNSYLVANIA, A CORPORATION OF PENNSYLVANIA.

ICE SAW.

Application filed March 25, 1922. Serial No. 546,725.

*To all whom it may concern:*

Be it known that we, SAMUEL T. FREAS and WILLIAM E. TRETCH, citizens of the United States, residing, respectively, in Trenton, Mercer County, New Jersey, and Philadelphia, Pennsylvania, have invented certain Improvements in Ice Saws, of which the following is a specification.

One object of our invention is to design an improved ice cutting saw of the type in which the feed can be controlled by the saw and the mechanism by which the saw is driven can be propelled over the ice at a predetermined speed.

A further object of the invention is to construct the saw so as to limit the feed per revolution and also to prevent the saw hammering in the kerf.

These objects we attain in the following manner, reference being had to the accompanying drawings, in which.

Fig. 1 is a view of sufficient of a saw to illustrate our invention and showing the cuts of several teeth in the ice;

Fig. 2 is an enlarged view showing more clearly the action of two of the teeth and the design of the portion of the blade back of each tooth; and Fig. 3 is a view of a modified form of saw having integral teeth.

1 is the blade of a circular saw having a series of recesses 2 at the periphery for the reception of the teeth 3 and the segmental locking plates 4. In the present instance, each locking plate and tooth is grooved at the back to receive the V-shaped edge 5 of the wall of the recess. Each tooth has a shoulder 6 at the back of the point, abutting against the portion 7 back of the tooth. The point 8 of the tooth is shaped in the manner shown in Fig. 1 to provide the correct bite to cut the ice.

The top of each tooth is given such a rake that it conforms with the edge of the portion 7 of the blade, generating a curve, which is the kerf cut in the ice by a single tooth when the saw is cutting the ice and propelling the machine on which it is mounted.

The curve of the tooth $3^a$ is shown by the line $x$. The curve of the tooth $3^b$ is shown by the line $x'$ and the curve of the tooth $3^c$ is shown by the line $x^2$. The curve that the tooth $3^d$ will produce is shown by the line $x^3$.

It will be noticed that the portion 7 back of each tooth gradually falls away from the curve of the tooth after it enters the ice, consequently, there is no hammering of the saw in the kerf and there is sufficient clearance to allow each tooth to cut without hindrance.

The method of determining the curve is as follows: For machines of different horse power, the feed must be controlled, first, to prevent stalling, or overload, and, second, to suit the operator so that he can walk at such a speed as is convenient for him to have control of the machine. Obtaining the required feed, and noting the circumference of the saw, the curve, which is a reproduction of the kerf cut in the ice by the saw, can be readily plotted. From this curve, the back of the projection of the saw is designed. The portions 7 serve as checks and control the feed per revolution, making each tooth take a proportional part in cutting.

By so designing the blade back of the tooth, hammering is eliminated and by having each portion 7 of the saw conform with the kerf when it starts to cut, it remains in contact with it until it has cut the length of the portion conforming to the predetermined curve.

Each tooth travels in a given path, one tooth cutting in advance of the other and the curve of the cut of four teeth is as shown in Fig. 1. As each tooth makes its cut, the machine is moving forward a given distance, dependent upon the shape of the portion of the blade back of each tooth.

Fig. 2 of the drawings shows the teeth advanced a part of a revolution, the tooth $3^c$ having cut a kerf farther into the ice, the tooth $3^d$ having entered the ice. The top of said tooth $3^d$ and the outer edge of the portion 7 back of the tooth have an extended bearing against the ice in the kerf, as at $y$, from the point 8 of the tooth to a line $a$. From the line $a$ the portion 7 has an abrupt curve away from the kerf.

The bearing of the tooth as it advances in the ice gradually decreases, the line of contact being comparatively short, as at $y'$, Fig. 2, and, when the tooth is at the full depth of the kerf, as at $y^2$, Fig. 1, then only the point of the tooth is in contact with the ice.

By this arrangement, the feed of the saw is controlled by the teeth as they enter the ice, and, consequently, the other teeth in the kerf cannot cut into the ice more than the predetermined depth.

While in Figs. 1 and 2 a saw having insertable teeth is shown, the saw may be made, as in Fig. 3, with teeth 3ᵉ integral with the blade 1ᵃ.

We claim:

1. A circular ice cutting saw of the self-feeding type having a series of teeth at its periphery, the edge of the saw back of the point of each tooth being convexly curved and conforming approximately to the curvature of the initial part of the kerf cut by the said tooth when the saw is fed at a predetermined rate.

2. A circular ice cutting saw of the self-feeding type having a series of teeth at its periphery, the edge of the saw back of the point of each tooth diverging inward from a concentric circle extending through the said point and also being convexly curved in approximate conformity with the curvature of the initial part of the kerf cut by the said tooth when the said saw is fed at a predetermined rate, the said edge of the saw back of each tooth being thus adapted to smoothly engage the kerf and to have an extended but gradually decreasing contact therewith whereby it serves to control the depth of cut of other teeth.

SAMUEL T. FREAS.
WILLIAM E. TRETCH.